United States Patent
Tate et al.

(10) Patent No.: US 11,198,089 B2
(45) Date of Patent: *Dec. 14, 2021

(54) FILTER WITH HIGH DUST CAPACITY

(71) Applicant: Parker Intangibles LLC, Cleveland, OH (US)

(72) Inventors: Jason Tate, Thompsons Station, TN (US); LaMonte A. Crabtree, Louisville, KY (US)

(73) Assignee: Parker Intangibles LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/912,043

(22) Filed: Jun. 25, 2020

(65) Prior Publication Data

US 2020/0324241 A1    Oct. 15, 2020

Related U.S. Application Data

(62) Division of application No. 14/847,736, filed on Sep. 8, 2015, now Pat. No. 10,730,001.

(60) Provisional application No. 62/047,334, filed on Sep. 8, 2014.

(51) Int. Cl.
*B01D 46/00* (2006.01)
*B01D 46/10* (2006.01)
*B01D 46/52* (2006.01)

(52) U.S. Cl.
CPC ....... *B01D 46/523* (2013.01); *B01D 46/0001* (2013.01); *B01D 46/10* (2013.01)

(58) Field of Classification Search
CPC .... B01D 39/04; B01D 39/18; B01D 39/1623; B01D 39/2017; B01D 39/202; B01D 39/1692; B01D 46/10; B01D 46/0001; B01D 46/28; B01D 46/30; B01D 46/32; B01D 46/36; B01D 46/543; B01D 46/522; B01D 46/523; B01D 46/0032; B01D 46/52; B01D 63/14; B01D 69/02; B01D 71/36;
(Continued)

(56) References Cited

U.S. PATENT DOCUMENTS

| 5,066,400 A | 11/1991 | Rocklitz |
| 5,290,447 A | 3/1994 | Lippold |
| 5,411,576 A | 5/1995 | Jones et al. |

(Continued)

FOREIGN PATENT DOCUMENTS

| CN | 103237584 A | 8/2013 |
| CN | 103732305 A | 4/2014 |
| DE | 19755466 A1 | 6/1999 |

OTHER PUBLICATIONS

U.S. Appl. No. 14/847,736, filed Sep. 8, 2015.

*Primary Examiner* — Minh Chau T Pham
(74) *Attorney, Agent, or Firm* — Reinhart Boerner Van Deuren P.C.

(57) ABSTRACT

A panel filter is provided. The panel filter can have extended life or higher dust holding capacity by one or more of the following provisions of (a) placing the dimpled pattern (compressed region) on the downstream side and outlet face of the media, (b) using the dimpled media in combination with adhesive spacers and embossments, (c) selection of a media that is depth loading rather than surface loading, (d) operating the pleater/embossing assembly in a manner so as to maintain integrity of the dimples and/or other features as described herein.

30 Claims, 10 Drawing Sheets

(58) Field of Classification Search
CPC .... B01D 2239/0216; B01D 2239/0654; B01D 2313/20
USPC ....... 55/486, 497, 498, 502, 521, 529; 96/11
See application file for complete search history.

(56) References Cited

U.S. PATENT DOCUMENTS

| | | | |
|---|---|---|---|
| 5,472,481 A | 12/1995 | Jones et al. | |
| 5,609,761 A | 3/1997 | Franz | |
| 5,782,944 A | 7/1998 | Justice | |
| 5,804,014 A | 9/1998 | Kahler | |
| 5,908,598 A | 6/1999 | Rousseau et al. | |
| 6,336,946 B1 | 1/2002 | Adams | |
| 6,419,871 B1 | 7/2002 | Ogale | |
| 6,685,833 B2 | 2/2004 | Lippold | |
| 6,709,480 B2 | 3/2004 | Sundet et al. | |
| 7,537,632 B2 | 5/2009 | Miller et al. | |
| 9,168,471 B2 | 10/2015 | Jung et al. | |
| 9,510,557 B2 | 10/2016 | Ball et al. | |
| 10,730,001 B2 * | 8/2020 | Tate .................... B01D 46/523 | |
| 2002/0162310 A1 | 11/2002 | Miller et al. | |
| 2002/0174770 A1 | 11/2002 | Badeau et al. | |
| 2003/0037674 A1 | 2/2003 | Allie et al. | |
| 2003/0141240 A1 | 7/2003 | Shiraishi | |
| 2004/0112023 A1 | 6/2004 | Choi | |
| 2005/0224170 A1 | 10/2005 | Shearin et al. | |
| 2006/0005517 A1 | 1/2006 | Sundet | |
| 2006/0277879 A1 | 12/2006 | Knowles | |
| 2008/0202078 A1 | 8/2008 | Healey | |
| 2010/0078379 A1 | 4/2010 | Rocklitz | |
| 2010/0107881 A1 | 5/2010 | Healey | |
| 2010/0269467 A1 | 10/2010 | Crabtree et al. | |
| 2010/0269468 A1 | 10/2010 | Crabtree et al. | |
| 2010/0313757 A1 | 12/2010 | Crabtree et al. | |
| 2010/0313760 A1 | 12/2010 | Crabtree et al. | |
| 2011/0186504 A1 * | 8/2011 | Rocklitz .............. B01D 46/522 | 210/493.1 |
| 2012/0167535 A1 | 7/2012 | Underwood et al. | |
| 2012/0223008 A1 | 9/2012 | Mbadinga-Mouanda | |
| 2014/0165839 A1 | 6/2014 | Crabtree | |
| 2015/5037515 | 12/2015 | Sahbaee | |
| 2016/0114280 A1 | 4/2016 | Dunaway | |
| 2017/0216757 A1 | 8/2017 | Ouyang | |
| 2018/0056226 A1 | 3/2018 | Buettner, III | |
| 2019/0046909 A1 * | 2/2019 | Haas ..................... B01D 46/10 | |
| 2019/0217239 A1 | 7/2019 | Gregerson | |

\* cited by examiner

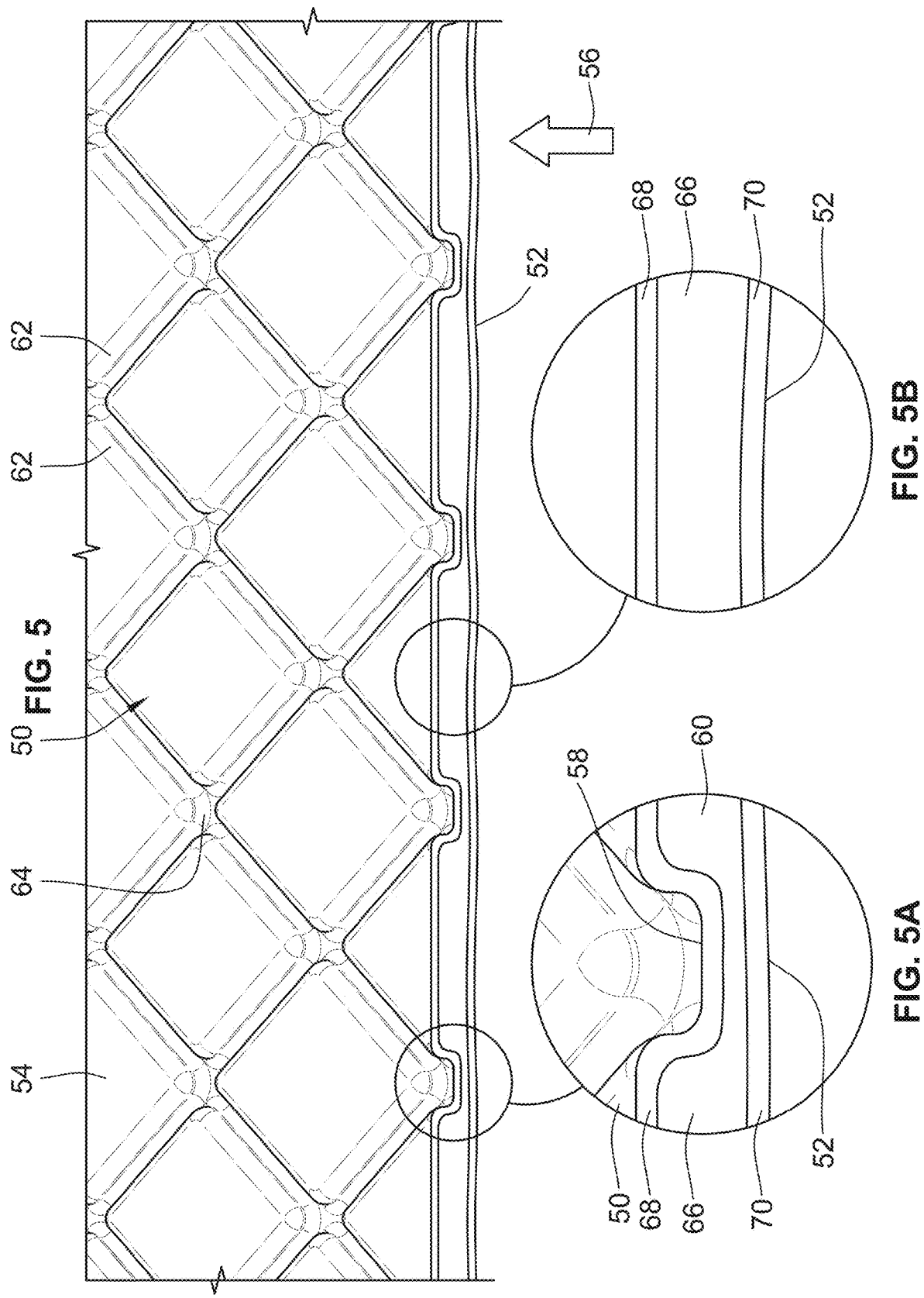

FILTER WITH HIGH DUST CAPACITY

CROSS-REFERENCE TO RELATED PATENT APPLICATIONS

This patent application is a divisional application of co-pending U.S. patent application Ser. No. 14/847,736, filed Sep. 8, 2015, which claims the benefit of U.S. Provisional Patent Application No. 62/047,334, filed Sep. 8, 2014, the entire teachings and disclosure of which are incorporated herein by reference thereto.

FIELD OF THE INVENTION

This invention generally relates to air filters, and more particularly relates to panel air filters that are used, for example, in Heating, Ventilation and Air Conditioning (HVAC) systems, air intakes for gas turbines, or industrial process applications for filtering air.

BACKGROUND OF THE INVENTION

Paneled air filters are commonly used for filtering air in forced air systems such as Heating, Ventilation and Air Conditioning systems, commonly known as HVAC, as well as air intakes for gas turbines, or industrial process applications for filtering air. Panel air filters generally comprise a rectangular filter media pack supported by a support structure in a rectangular configuration such as being surrounded and supported by a die cut paper board panel frame or by strips, bands, scrims, screens or the like, and/or by plastic header frames.

One common type of filter media used in panel filters is pleated filter media that includes a plurality of peaks and valleys. Various prior art implementations are known to support pleated filter media so that the panel filters may withstand air pressure during operation. Such prior art includes U.S. Pat. No. 6,709,480 to Sundet et al.; U.S. Pat. No. 5,782,944 to Justice; and U.S. Patent Publication Number 2007/0294988, and US 2014/0165839 to Crabtree, both assigned to the present assignee, the entire disclosures of all of which are hereby incorporated by reference thereto.

Generally, in panel filter implementations, there are competing interests involved. On the one hand, a panel filter must provide sufficient dust holding capacity without plugging prematurely to provide adequate filter life span. Additionally, the filter has to provide a suitable particle capture efficiency by removing sufficiently small particles such as dust and allergens from the air that are known to be entrained in such forced air ventilation systems.

In some applications, a Minimum Efficiency Reporting Value (MERV) value of at least 13 or greater is desired.

In other applications such as pre-filters with downstream finishing filters, a lower MERV value is acceptable such as 8, as in the case of pre-filters for air intakes for gas turbines. The present application has applicability to these applications too.

For both highly efficient filters and less efficient filters, having a high dust load capacity is desirable.

In such applications, on the other hand, it is desirable not to restrict the flow of air and thereby provide for an open filter structure that allows for easy air flow through the pleated panel filter. The primary reason is that plugging is determined by the pressure drop that is experienced across the filter. Additionally, restricting airflow makes it harder for an HVAC system to deliver hot, cold and/or ventilated air resulting in energy loss. One test for determining the service life of a filter is evaluating dust holding capacity of the filter when the final resistance or pressure drop across the filter reaches 1.5 inch (3.8 cm) in water gauge pressure at a face velocity of 492 feet (150 meter) per minute, which is a standard ASHRAE 52.2-2012 test. Thus, while a restrictive media is desired so as to enable adequate particle capture efficiency, a more open media is desired for air flow characteristics and to prevent premature clogging.

As a result, prior art panel filters have often been a compromise between these two competing interests.

BRIEF SUMMARY OF THE INVENTION

The present invention is directed toward several different aspects and features that may be used together or independently as outline below.

According to one aspect, a filter media element, comprises a filter media sheet having an inlet face and an outlet face, the filter media sheet being pleated to include a plurality of pleat tips including a first set of pleat tips along an upstream extent and a second set of pleat tips along a downstream extent with pleat flanks extending between the first set of pleat tips and the second set of pleat tips. The filter media element also comprises a plurality of adhesive elements extending between adjacent members of the pleat flanks and attaching adjacent members of the pleat flanks to separate and space the pleat tips in a spaced relation. Further, different filtration regions including a compressed filtration region and a remainder filtration region formed into the filter media sheet providing the filter media with different filtering properties in the different filtration regions.

According to a feature, the compressed filtration region may cover between 5 and 50% of the filter media sheet, with the remainder filtration region comprising the remainder and, wherein the compressed filtration region defines a compressed thickness, and the remainder filtration region comprises a regular thickness, the compressed thickness being between 20 and 70% thinner than the regular thickness. In some more preferred embodiments, the compressed filtration region covers between 8 and 20% of the filter media sheet, and the compressed thickness is between 30 and 50% thinner than the regular thickness.

In some embodiments, the compressed thickness may be between 0.5 and 1.3 millimeter and wherein the regular thickness is between 1.5 and 3 millimeter.

According to an aspect and feature, a filter media element can have at least a MERV 13 efficiency rating, and a volumetric dust holding capacity of greater than 0.040 grams/cubic-inch at measured according to ASHRAE 52.2-2012 standard, and more preferably a volumetric dust holding capacity greater than 0.055 grams/cubic-inch.

It is a feature that the adhesive elements may be laid upon the filter media sheet along a continuous or discontinuous bead that forms a linear path extending transverse relative to the pleat tips, the continuous or discontinuous bead being laid on both the inlet face and the outlet face of the filter media sheet.

Another feature comprises a plurality of embossments formed into the filter media sheet and intersecting the compressed filtration regions and the remainder filtration regions, the embossments being formed in rows that run transverse to the pleat tips, wherein the embossments are proximate pleat tips, and wherein the embossments are on formed into adjacent members of the pleat flanks and project toward each other to narrow a pleat valley defined between adjacent members of the pleat flanks at a location proximate pleat tips, and wherein the adhesive elements extends over the embossments and extend along the rows.

In some embodiments, the different filtration regions form a pattern on the outlet face the compressed filtration region extending diagonally relative to the pleat tips.

It is another feature, that the compressed filtration region may be formed into the outlet face wherein the outlet face comprises elevations and depressions corresponding to the remainder filtration region and the compressed filtration region, respectively.

It is another feature that the filter media sheet may be a composite of coarser fibers and finer fibers, the coarser fibers having a diameter greater than 2 micron and the finer fibers having a diameter of less than 2 micron, wherein a heavier relative coverage of coarser fibers are arranged proximate the inlet face compared to an outlet face of the filter media sheet, the spaced region being spaced from the inlet face by at least 0.2 millimeter, and wherein a heavier relative coverage of finer fibers are arranged in the spaced region of the filter media sheet as compared to the inlet face.

Another feature may be that the coverage of fine fiber may be closer to the outlet face as compared to the inlet face.

Another feature may be that the filter media sheet is a single layer composite and not multilayer laminated.

Another aspect is directed toward a panel filter comprising the filter media element described according to any of the aspects or features above or below. The panel filter includes a border frame with the filter media element being surrounded by the border frame, and wherein the filter media element defines an envelope size with a first and second mutually perpendicular spans of between 12 and 36 inches; and a depth of between 1 and 12 inches.

A feature may be that between 1.5 and 4.5 pleats per inch are provided.

Another aspect is directed toward a method of using a panel filter element described according to any of the aspects or features above or below. The method comprises flowing air through the air filtration system, the air filtration system comprising a housing having a flow path conveying air to at least one of an HVAC system, air inlet for gas Turbine engine, and an industrial process application, and the panel filter being installed in the housing with the inlet face disposed upstream along the flow path relative to outlet face.

It is a feature that such method may be in an air filtration system that is free of a back-pulse mechanism.

Another aspect is directed toward a method of using any of the filter media elements described herein comprising advancing air flow through the filter media element in a direction from the upstream extent to the downstream extent to cause particulates to load in a depth of the filter media.

Other aspects described below may also be used in conjunction with the aspects or features above.

Another aspect is directed toward a filter media element comprising a filter media sheet having an inlet face and an outlet face, the filter media sheet being pleated to include a plurality of pleat tips including a first set of pleat tips along an upstream extent and a second set of pleat tips along a downstream extent with pleat flanks extending between the first set of pleat tips and the second set of pleat tips; wherein the filter media element has at least a MERV 14 efficiency rating (according to ASHRAE 52.2-2012 standard), and a volumetric dust holding capacity of greater than 0.040 grams/cubic-inch according to ASHRAE 52.2-2012.

Another aspect is directed toward a filter media element comprising a filter media sheet having an inlet face and an outlet face, the filter media sheet being pleated to include a plurality of pleat tips including a first set of pleat tips along an upstream extent and a second set of pleat tips along a downstream extent with pleat flanks extending between the first set of pleat tips and the second set of pleat tips. Different filtration regions including a compressed filtration region and a remainder filtration region are formed into the filter media sheet providing the filter media with different filtering properties in the different filtration regions. The compressed filtration region is formed into the outlet face wherein the outlet face comprises elevations and depressions corresponding to the remainder filtration region and the compressed filtration region, respectively.

Another aspect is directed toward a method of making a filter, comprising: advancing a filter media sheet having an inlet face and an outlet face and with different filtration regions including a compressed filtration region and a remainder filtration region formed into the filter media sheet providing the filter media with different filtering properties in the different filtration regions through a heater; heating the filter media sheet; thereafter embossing the filter media sheet with embossments; scoring the filter media sheet with scores running transvers to the advancing; laying continuous or discontinuous adhesive beads along the filter media sheet and over the embossments; and folding the filter media sheet along the scores to provide a plurality of pleat tips including a first set of pleat tips along an upstream extent and a second set of pleat tips along a downstream extent with pleat flanks extending between the first set of pleat tips and the second set of pleat tips; and a plurality of adhesive elements extending between adjacent members of the pleat flanks and attaching adjacent members of the pleat flanks to separate and space the pleat tips in a spaced relation.

It is a feature that during the embossing, the embossing maintains a thickness of the filter media sheet to within 15% of an original thickness.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 5 is a cross-section and perspective illustration of a filter media sheet having compressed and remainder filtration regions and shown prior to embossment operations in the pleater, and schematically showing a heavier concentration of finer fibers in an spaced region of the media with artificial lines drawn into the cross section to delineate an spaced region;

FIGS. 5A and 5B are enlarged portions of the cross section shown in FIG. 5;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
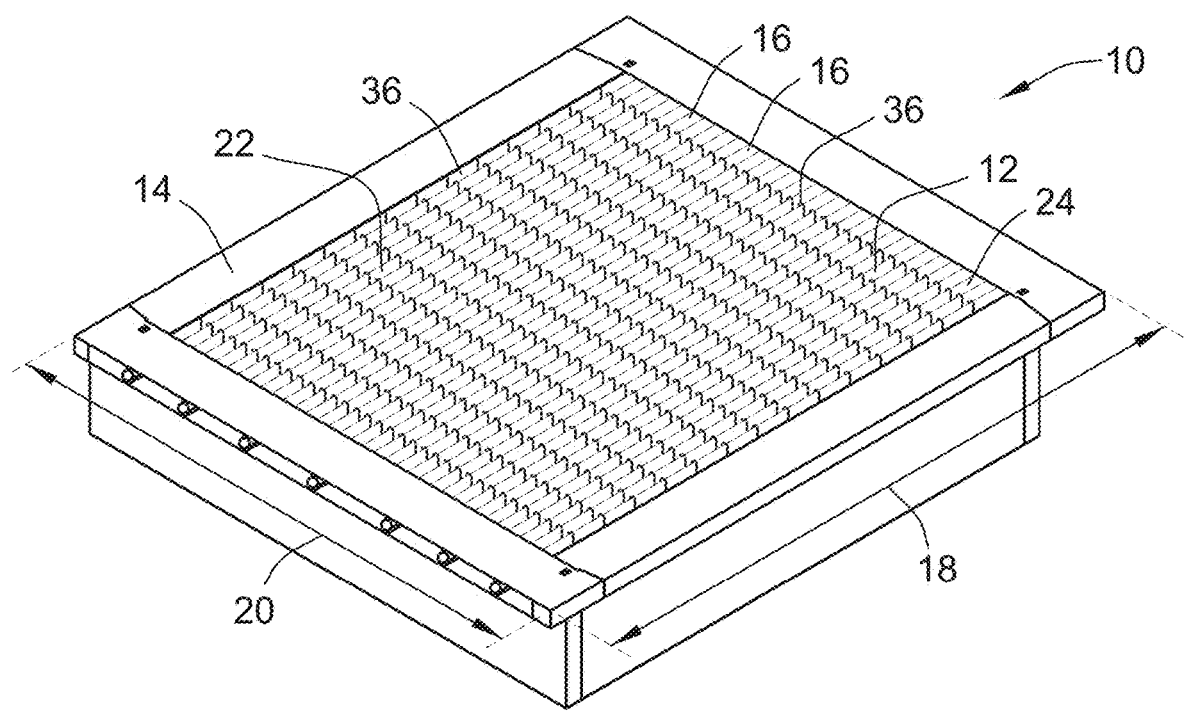
FIG. 1 is a perspective view of a panel filter element according to a first embodiment of the present invention.
Figure 2:
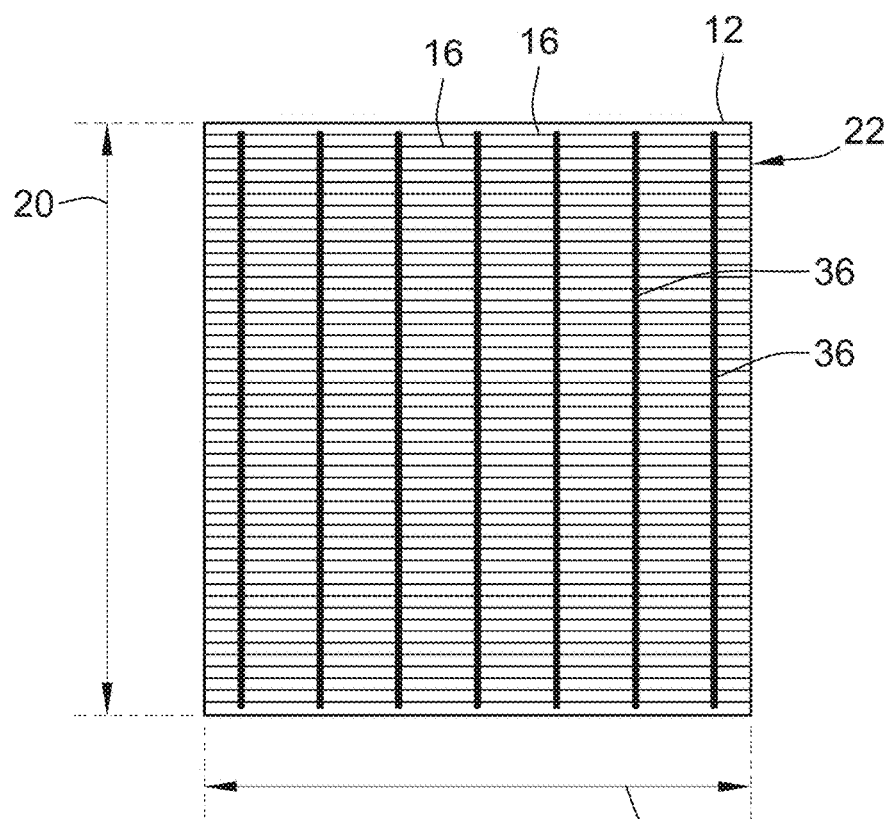
FIG. 2 is a frontal view of a rectangular filter media pack that may itself be used as a panel filter or, more preferably, that may be framed such as being employed in the panel filter of FIG. 1.
Figure 3:
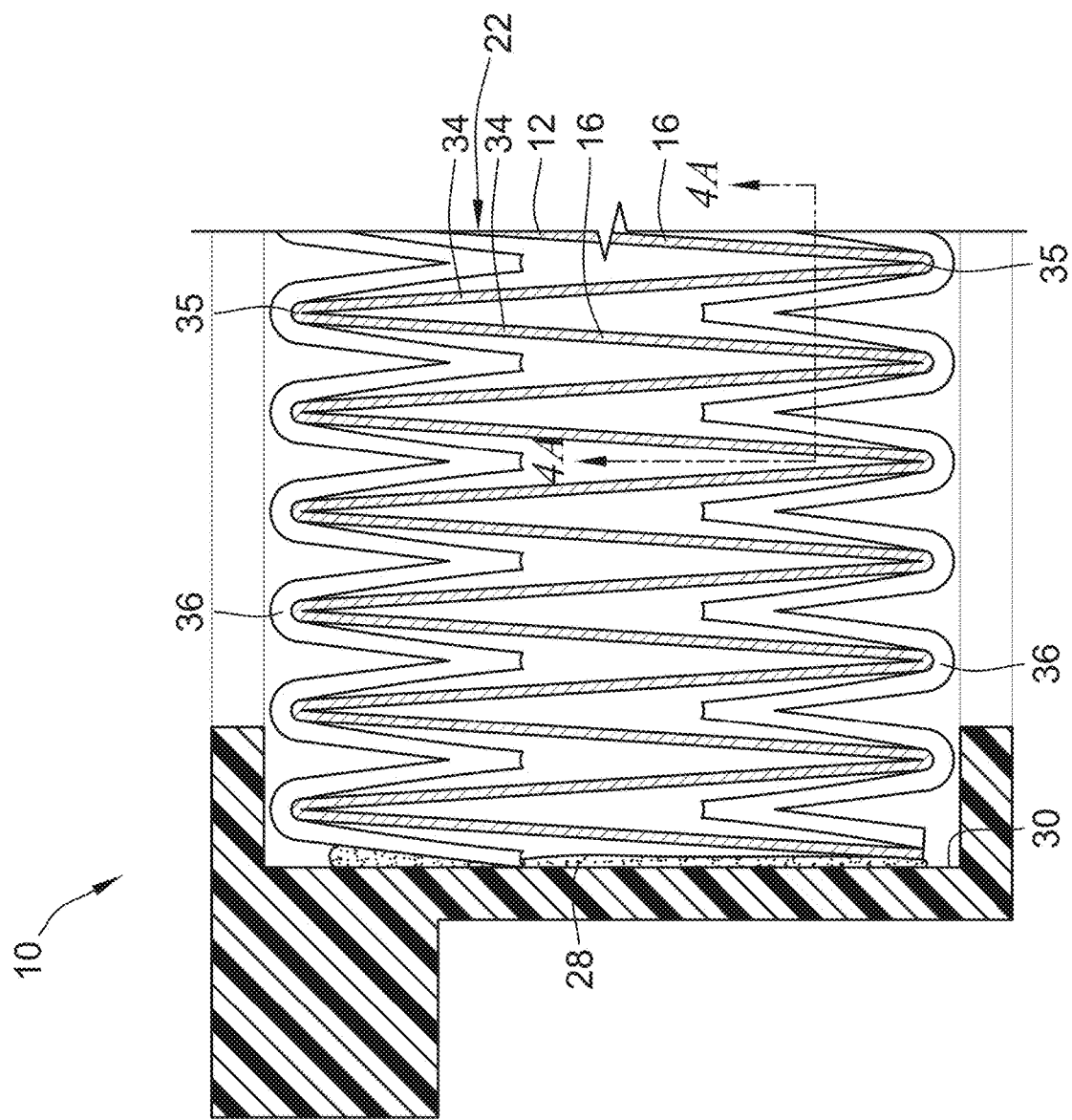
FIG. 3 is a partly schematic cross section of FIG. 1 taken through one of the adhesive beads of adhesive spacers; shown without embossments, the compressed/remainder filtration regions nor flattened pleat tips shown to avoid undue complication in this FIG. (See FIGS. 4A-4C and 5 for further details as to these other features).

FIGS. 1-3 illustrate embodiments of a panel filter 10 of the present invention. The panel filter 10 generally includes a pleated filter media 12 that is arranged in a rectangular card-like structure and that is maintained in that rectangular card-like configuration by a suitable support structure such as a rectangular plastic frame 14, as shown.

The pleated filter media 12 is formed from a relatively thin porous material such as an entanglement of polymeric fibers and/or cellulose or glass fibers that permits air to readily pass through, but intercepts solid particles such as dust, lint and the like. The panel filter 10 illustrated is particularly suited for Heating, Ventilation and Air Conditioning (HVAC) systems, and other industrial applications such as air inlet filters (main filter or pre-filters) for gas turbine engines, or other industrial applications such as animal confinement buildings, clean room filtration, manufacturing or energy process filtration. The filter media is folded into multiple pleats 16 to provide sets of pleat tips 35 on each side (both inlet and outlet sides) of the panel filter 10.

Pleats are provided with the full face of pleat flanks exposed during use (not blinded) with structural support discussed herein with a pleat density typically between 1.5 and 4.5 pleats per inch.

As for size, for typical applications, the panel filter 10 may span a first lateral span 18 of between 12 and 30 inches and a second lateral span 20 transverse to the first span that is also between about 12 and 30 inches. Pleat depth can be measured normal to these spans 18 and 20.

In various embodiments, the pleat depth may be between 1 and 12 inches (fractions being rounded up in this instance considering that the panel filter element need only fit an envelope that size; thus a ⅞th inch pleat depth would be considered a 1 inch depth filter). For many embodiments with a plastic frame for many industrial applications, the pleat depth between 4 inches and 12 inches, with lateral width spans each spanning between 12 inches and 30 inches.

Figure 6:
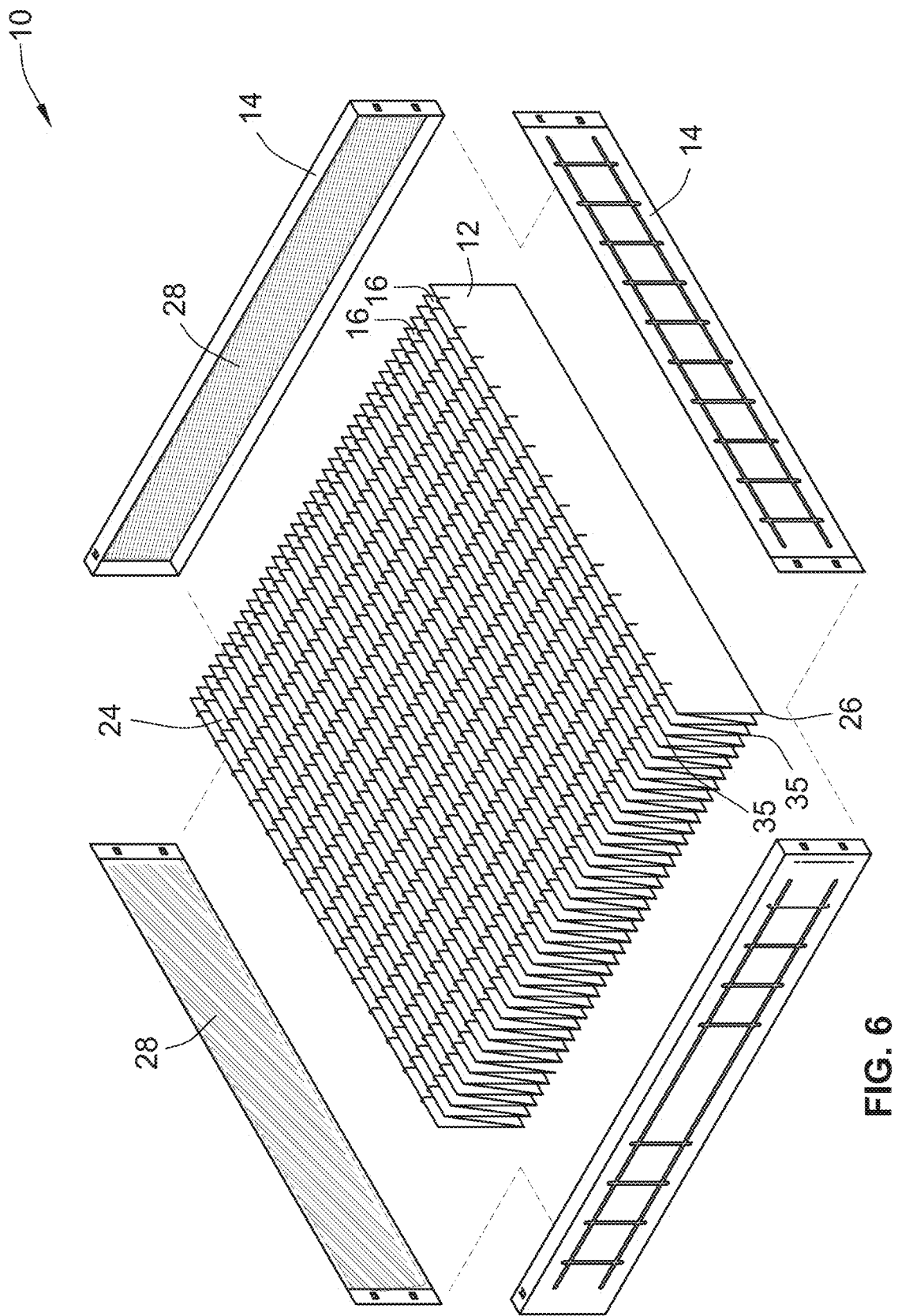
FIG. 6 is an exploded assembly view of the panel shown in FIG. 1.

In the embodiment shown in FIG. 1 and also demonstrated by FIGS. 3 and 6, each of the inlet side 24 and outlet side 26 of the pleated filter media 12 are supported by the frame 14, which may comprise multiple channel parts that are assembled together as shown in the embodiment of FIG. 6. Alternatively, paperboard frames, border frames, edge band frames or the like, may be used. The pleated filter media 12 is glued to the channels of the frame 14 along a rectangular periphery that also provides a rectangular border seal between the filter media and the frame.

With this configuration and with adhesive 28 laminated to the inner surface of the frames 14, it can be seen that the filter media 12 is supported and by the frame channels 30 that extend along an inside of the frame 14.

To achieve an organized filter media configuration and support for the filter media 12, the embodiment employ adhesive spacer beads 36 which may be continuous or discontinuous, and which are laid down by an adhesive bead line applied upon both the inlet side 24 and outlet side 26 of the pleated filter media during manufacture. The beads 36, serve to provide structural support to the pleated filter media to hold the structure into a rectangular filter media pack 22.

Generally, the adhesive spacer beads 36 are continuous or discontinuous strips of adhesive that are laid as the media is being run in the direction of the second span in a continuous manner over each of the inlet side 24 and outlet side 26 to form the adhesive spacer beads 36 on opposing sides of the filter media, thereby forming the filter media pack 22.

Figure 4:
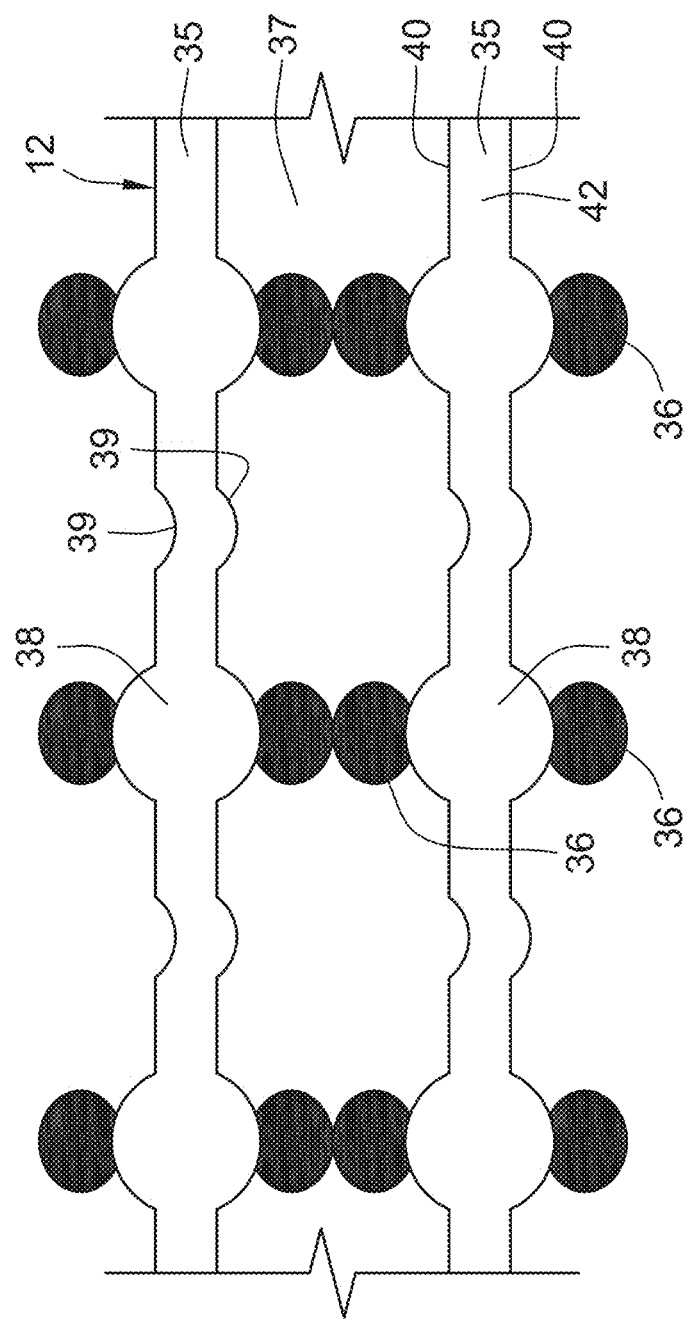
FIG. 4 is a schematic top view of the embossed and adhesively spaced filter media viewed from either of the inlet and outlet sides, which views are the same, and taken through the pleat tips parallel to one of the inlet and outlet faces, without the compressed/remainder filtration regions shown and with the glue not covering the pleat tips in this illustration.
Figure 4A:
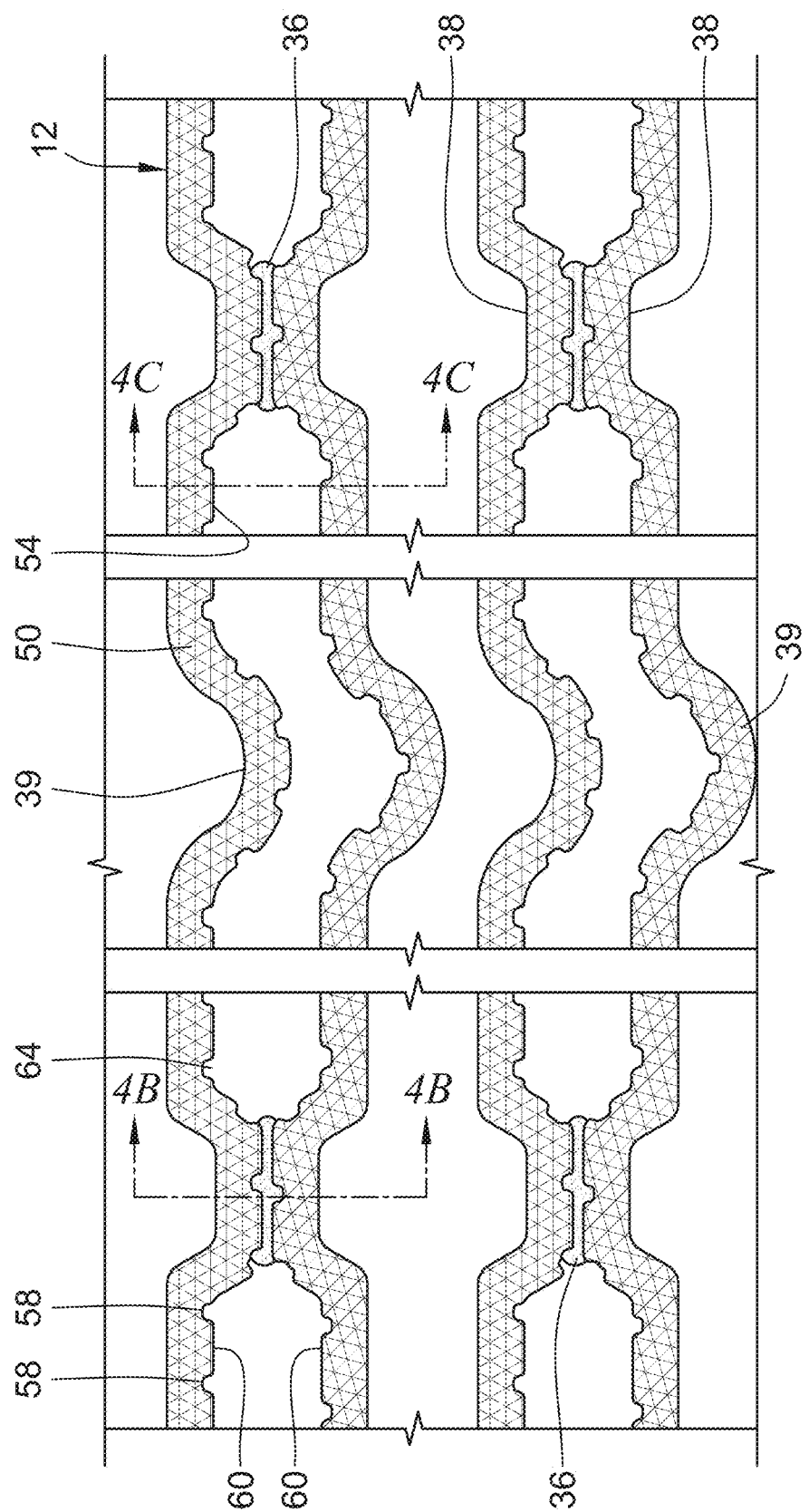
FIG. 4A is a cross section of the filter media pack that may be taken about line 4A of FIG. 3.
Figure 4B:
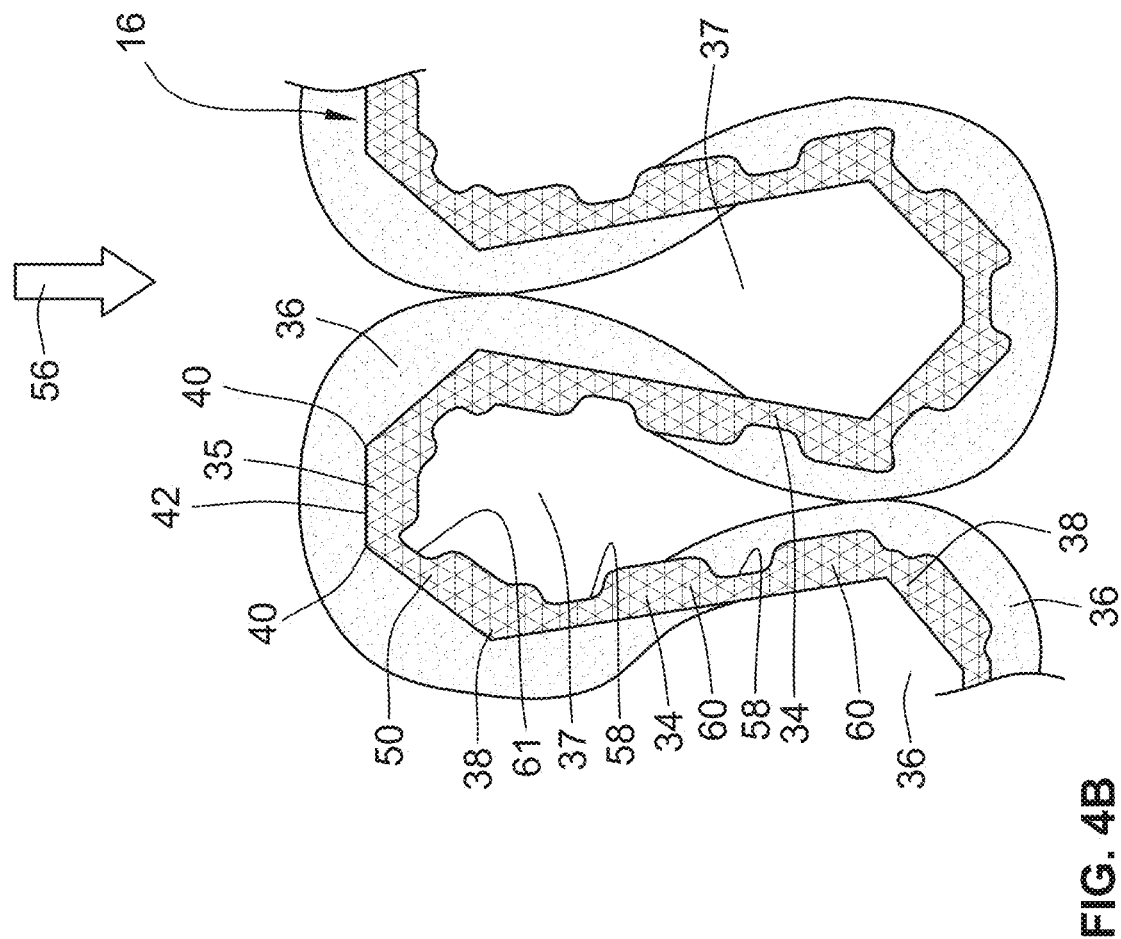
FIGS. 4B and 4C are cross sections of filter media that may be taken about lines 4B-4B and 4C-4C respectively of FIG. 4A.
Figure 4C:
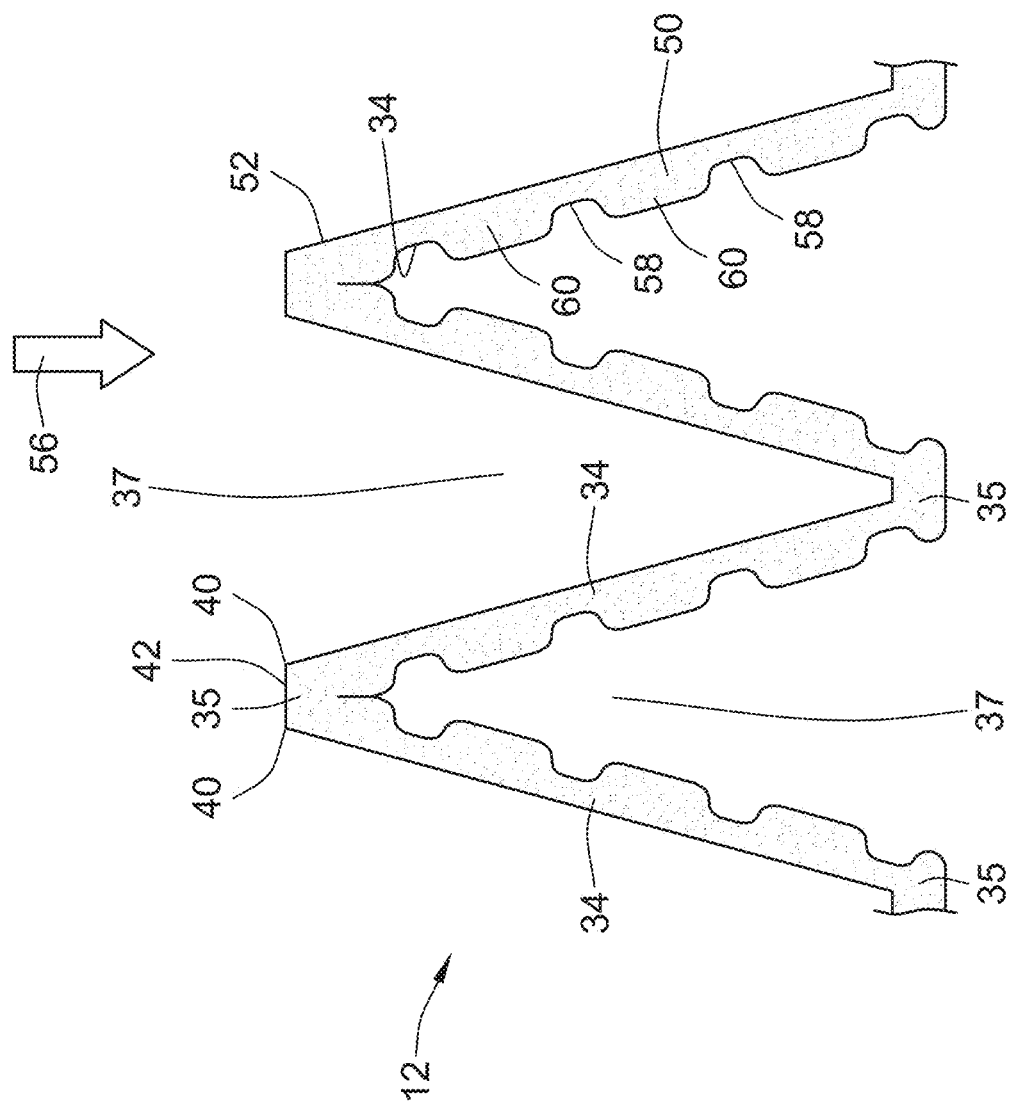

As can be seen in FIGS. 3, and 4A-4B, the adhesive spacer beads 36 therefore extend up and over pleat tips and down partially into pleat valleys along the pleat flanks and therefore at least partially into the V-shaped channels formed between adjacent pleat flanks. Alternatively, in some embodiments the adhesive beads 36 may reach all the way to the bottom of such V-shaped channels as the adhesive spacer beads are laid continuously.

The adhesive spacer beads may be laid down in parallel lines at a spacing (relative to the next adjacent adhesive bead) between ½ and 4 inches and in some embodiments, more preferably between 1 and 2 inches. This provides sufficient structural support to maintain the pleat shape and V-shaped channels 37 with sufficient open volume to provide airflow without undue restriction. The adhesive spacer beads 36 also afford support to prevent the pleats from collapsing and contacting each other to prevent blinding off the filter media during operation.

For example, V-shaped channels 37 do not deform or collapse very much during use, which maintains airflow into the channels to move through filter media of pleat flanks. As a result, much more of the surface area of the pleated filter media 12 is exposed for full filtration and dust loading purposes. Further, the configuration allows for dust cake accumulation without prematurely filling or blocking the V-shaped channels 37 with this pleat density and support structure configuration.

To assist in the spacing and structural integrity, various embossments 38 are preferably provided to widen the pleat flanks at the select areas where the adhesive spacer beads 36 are laid down. This can be seen, for example, in FIG. 4 whereby embossments are formed such as by heat setting and/or compression forming into the pleat flanks 34 every one to 2 inches (or between ½ and four inches in some other embodiments depending upon the spacing of the adhesive spacer beads 36). Embossments 38 provided a shorter span needed for the adhesive to bridge across the V-shaped channels 37 between adjacent pleats. Additionally, additional embossments 39 may be interspaced between the adhesive spacer bead embossments 38 as illustrated also at a similar spacing of the adhesive spacer bead embossments 38. These other embossments 39 do not receive a glue bead, but provide for additional structural support and also prevent flat surface-to-surface contact between filter media along the pleat flanks 34 in response to airflow forces during use.

For clarity, embossments 38 and 39 should not be confused and are not the same as the compressed and remainder filtration regions as described herein. Instead, the thickness of the media at the embossments may remain the same (i.e. compression or expansion as a result of emboss rolls if any is insignificant, less than 15% of thickness) as compared to the compressed and remainder filtration regions that have notably different filter media thicknesses by design.

Further, point bonding where different discrete layers of media are welded together at point bonds also is not to be confused with compressed filtration regions and remainder filtration regions. In particular, point bonding at those locations typically eliminates the filtration of that region rendering non-filtering. Further, in embodiments, typically a one integrated layer composite media is used or chosen, although multiple discrete layers composites that are laminated together may also be used in alternative embodiments.

Referring to FIG. 2, it can be seen that this may provide a filter media pack 22 that has employed the adhesive spacer beads 36 and embossments 38, 39 (of FIG. 4) such that the filter media pack 22 is ready to be framed via frame 14 for use to create the panel filter shown in FIG. 1.

As evident in embodiments above, to provide a support structure for supporting the media in a rectangular configuration, various frames, scrims, bands and the like may be used in addition to, or in the alternative to those disclosed according to the embodiments described above. Support structures in various other embodiments of the present application may be used such as disclosed in U.S. Patent Publication Number 2012/0167535 entitled, "Self Supported Pleated Panel Filter With Frayed Edges"; U.S. Patent Publication Number 2010/0269468 entitled, "Panel Filter"; U.S. 2010/0269467 entitled, "Panel Filter"; U.S. Pat. No. 7,537,632 entitled, "Panel Filter With Frame"; U.S. Patent Publication Number 2005/224170 entitled, "Method and System for Making Filters"; and U.S. Pat. No. 5,782,944. Each of these patents are incorporated by reference in their entireties for support structures and panel filter details may be used as alternatives or an addition to those in embodiments discussed specifically herein.

Some embodiments may alternatively or additionally include pleat supports and spacers between adjacent pleat flanks 34 (FIG. 3). For filter elements configured to operate in high-flow-rate environments, spacers, such as plastic finger spacers or bars, or hot-melt adhesives spaced at regular intervals, may be placed at regular intervals along the pleated filter media to add structural rigidity and prevent deformation of the media.

In addition to being pleated with heat setting of the pleats, the filter media may also be embossed to add structural rigidity, to further increase surface area, and to increase amount of media that can be manipulated into a volume for the panel filter 10. A method of embossed filter media is described in U.S. Pat. No. 6,685,833. U.S. Pat. Nos. 5,290,447, 5,804,014 and DE 19755466 A1 also describe methods of embossing that, in some embodiments, may be applied to the composite filter media of the present invention as an addition or alternative. Each of these patents are incorporated by reference in their entireties, as these or other pleating and embossing technologies may be used.

For example, integrally formed embossments 38 (grooves, folds or wrinkles extending between pleat tips 35 and between inlet and outlet faces) formed into the filter media and adhesive spacer beads 36 are illustrated on the filter media of filter media pack 22 as shown in FIGS. 1-5. Various numbers and arrangements of embossments can be provided. The adhesive beads are on adjacent pleat tips and extend along pleat sides and attach to each other as shown. This provides consistent pleat spacing and structural integrity to the pleated filter pack. Adjacent pleat tips may be spaced between ½ and 2 centimeters to compact a substantial amount of filter media into the envelope while at the same time keeping an open flow structure to accommodate high air flow capacity.

Also, the pleat tips may be flattened with two creased edges 40 and a flat 42 therebetween as schematically illustrated in FIG. 4 and better shown in FIG. 4B. Flats 42 may between 0.5-2.5 millimeters wide in some embodiments.

To better facilitate for structural integrity and high air flow, some preferred embodiments may include additional pleat supports and spacers between adjacent pleat flanks 34. For filter elements configured to operate in high-flow-rate environments, spacers, such as plastic finger spacers or hot-melt adhesives spaced at regular intervals, may be placed at regular intervals along the pleated filter media to add structural rigidity and prevent deformation of the media. In addition to being pleated with heat setting of the pleats (e.g. with bi-component filter media with high melt and low melt fibers and/or high melt and low melt components in fibers), the filter media may also be embossed to add structural rigidity, to further increase surface area, and to increase amount of media that can be manipulated into a volume for panel filter. Any of these aforementioned structures may be employed as support structure to maintain a rectangular configuration as an alternative to or in addition to frames (e.g. die cut frames and/or edge banding).

In accordance with various aspects, the embossed pleated filter media 12 may be made with a non-uniform filter media sheet 50 having an inlet face 52 and an outlet face 54 (the inlet face 52 and the outlet face 54 facing the inlet side 24 and the outlet side 26, respectively). The inlet face 52 and the outlet face 54 may be arranged in a predetermined orientation relative to air flow 56 as explained herein.

The filter media sheet 50 includes different filtration regions including a compressed filtration region 58 and a remainder filtration region 60 formed into the filter media sheet. This provides the filter media with different filtering properties in the different filtration regions.

The compressed filtration region 58 and a remainder filtration region 60 may be formed in accordance with US Patent Publication No. 2013/0269529 to Jung et al. and assigned to Irema Filter GmbH, the entire disclosure of which is hereby incorporated by reference. The filter media may be arranged according to Jung et al.

However, contrary to the '529 publication to Jung et al., in a preferred embodiment, the compressed filtration region 58 is formed into the outlet face 54 such that the outlet face 54 comprises elevations and depressions corresponding to the remainder filtration region 60 and the compressed filtration region 58, respectively. This creates a different mechanism for filtrations of particulates.

Further, in many applications, these filters may not be employed with a reverse pulse release mechanism, but instead act as depth loading panel filters. This may be used to provide a high efficiency (e.g. MERV 13 or 14 or higher) in combination with a high dust loading capacity.

The different filtration regions may form a pattern 62 on the outlet face 54, with the compressed filtration region comprising compressed grooves or indentations 64 extending diagonally relative to the pleats or pleat tips. With the orientation, this may create bag like pockets with the remainder filtration region 60 on the outlet face 54.

Preferably, the compressed filtration region 58 covers between 5 and 50% of the filter media sheet, more preferably between 8 and 20% (with the remainder filtration region 60 comprises the remainder percentage).

In some embodiments, the compressed filtration region 58 defines a compressed thickness, and the remainder filtration region comprises a regular thickness, the compressed thickness being between 20 and 70% thinner than the regular thickness, more preferably between 30 and 50%. The compressed thickness being measured at the bottoms of the grooves that form the dimples that provide the thinnest locations.

In some embodiments, the compressed thickness is between 0.5 and 1.3 millimeter, and wherein the regular thickness defined by the remainder filtration region 60 is between 1 and 4 millimeter (more preferably between 1.5 and 3 millimeter).

Panel Filter Sizes & Media Pack Amounts & Pleat Spacing

Generally in the panel filter art, the sizes are relatively standard. A common size is a 24 inch×24 inch×4 inch filter. This means the filter will fit an envelope of that size but is typically a bit smaller to allow for easy installation. For example, the actual depth of the filter frame may be 3 and ¾ inch and the pleat depth about 3 and ¼ inch for a 4 inch fitting filter. Therefore, useful measures are made using these depths.

Filter Medias

One preferred filter media includes grade designations TFN80G and TFN83G commercially available from Irema Filter GmbH of Pastbauer-Pavelsbach, Germany (herein "Irema"), which have a loft or caliper thickness of about 2 millimeters. This filter media sheet comes with the formed compressed filter region and the remainder region and can be then run through a pleating and embossing machine to create the panel filter elements. These types of media such as available from Irema with the compressed filtration regions 58 and the remainder region 60 may be referred to as "dimpled media" herein.

Other suitable filter medias are available from other suppliers. For example, media grades of Transweb, LLC of Vineland, N.J. include various permanent electret filter medias, that can also be dimpled into a pattern and used in the various embodiments.

Various electret filter medias may have an electrostatic charge such as by way of fluorine atoms. Fluorinated polymers, chemical additives or plasma fluorination for example may be used to impart fluorine atoms.

In an embodiment, the filter media is preferably not a surface loading media, but may be a depth loading filter media. The filtration efficiency may be obtained from fine fibers less than 2 micron and preferably less than 1 micron contained within the depth of the filter media and/or applied to the outlet face. In an embodiment, the filter media sheet may be a composite of coarser fibers and finer fibers, the coarser fibers having an average diameter between 2 and 10 micron and the finer fibers having an average diameter of less than 1 micron (also known as nanofibers). A variety of different sized coarse fibers may be employed as shown in FIG. 7, which is a cross-section through the Irema filter media noted above.

Figure 7:
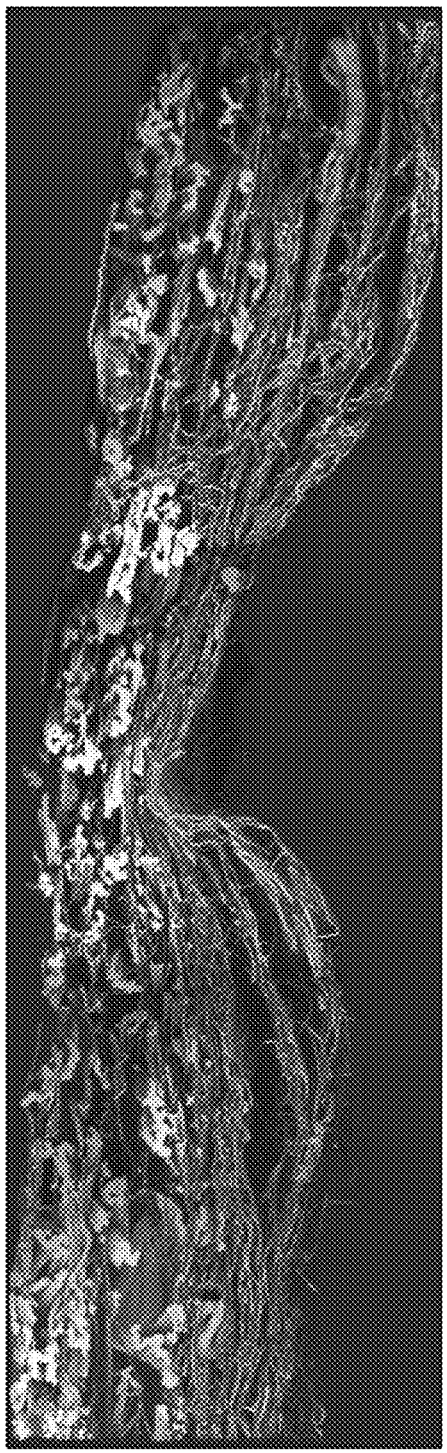
FIG. 7 is a microscopic photograph of a cross sectional cut through the filter media according to an embodiment of the present invention showing the compressed and remainder filtration regions and the coarse fibers of the filter media.
Figure 8:
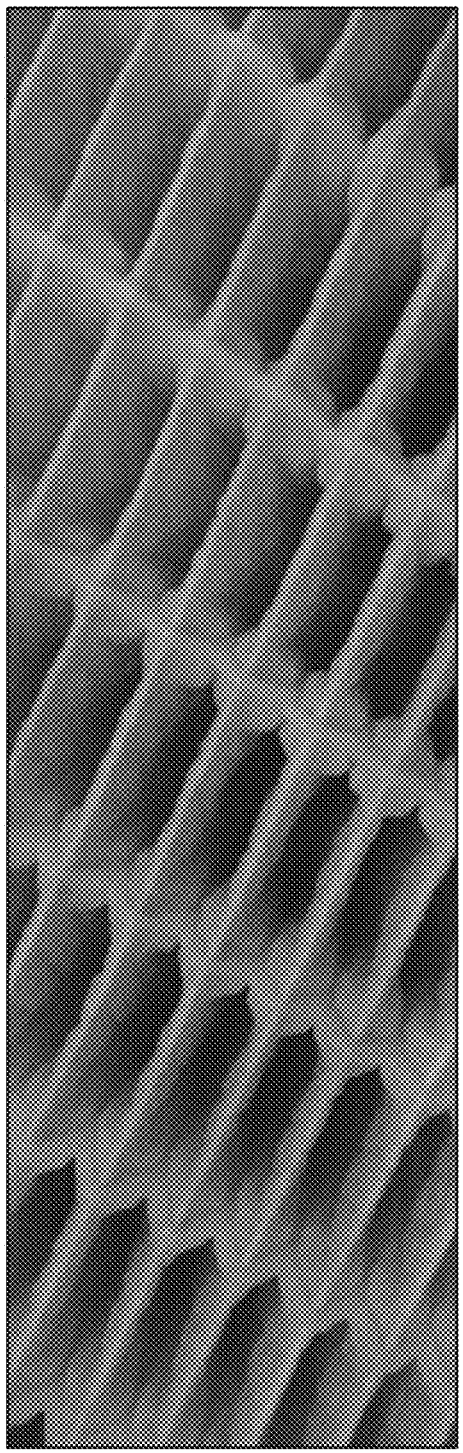
FIG. 8 is a photograph of a filter media along the downstream side according to an embodiment of the present invention showing the compressed and remainder filtration regions in a pleated and embossed assembled form with adhesive spacers.

Further, and as shown in FIG. 7, and consistent with a depth filter media, a heavier relative coverage of the coarser fibers are applied with the coarsest fibers arranged proximate the inlet face 52 compared to an outlet face 54 of the filter media sheet. Further, a spaced region 66 may be spaced from the inlet face 52 by at least 0.2 millimeter (preferably at least 0.5 millimeter) such as shown schematically shown in FIG. 5 (see also FIG. 7) with a heavier relative coverage of finer fibers under 2 micron (and more preferably under 1 micron) that are arranged in the spaced region 66 of the filter media sheet 50 as compared to the inlet face 52 or inlet region (the inlet region 70 being the region upstream of the spaced region 66; and the spaced region 66 including the outlet region 68).

Considering that the media may be considered depth loading, the coverage of fine fibers within the spaced region are preferably closer to the outlet face 54 as compared to the inlet face 52. This can be seen in an embodiment example with finer fibers shown proximate the dimpled outlet face in the microscopic image of FIG. 7 (finer nanofibers not seen in FIG. 7 may also be present and disposed proximate the outlet face and/or in the spaced region 66).

In embodiments, the filter media may comprise nonwoven polymeric such as polyolefin fibers with a basis weight of between 100 and 200 grams per square meter and a media thickness (measured at remainder filtration regions) of between 1 and 4 millimeter, thereby providing for high loft. The high loft provides a high dust loading capability and air permeability.

To provide for heat setting and embossing of pleats, the filter media base preferably includes a component polymeric structure including a high melt polymer and a low melt polymer.

The selected media may have an air permeability of between 45 and 600 cfm at 0.5 inch WG pressure according flat sheet media testing. The air permeability may depend upon application, as prefilters with MERV 8 applications for gas turbine may have higher flow rate media, while engine air applications may have lower flow rate media.

According to certain embodiments, the filter media sheet is a composite of coarser fibers and finer fibers, the coarser fibers having a diameter between 2 and 10 micron and the finer fibers having a diameter of less than 2 micron, and preferably less than 1 micron.

According to certain embodiments, a heavier relative coverage of coarser fibers is arranged proximate the inlet face compared to a spaced region of the filter media sheet. The spaced region may be defined as being spaced from the inlet face and the outlet face by at least 0.2 millimeter.

Further the media sheet 50 may have a heavier relative coverage of finer fibers are arranged in the spaced region of the filter media sheet as compared to the inlet face.

Also in a different embodiment, the coverage of fine fiber may be closer to the inlet face as compare to the outlet face.

Further, for higher efficiency and primary filter applications, the filter media element has at least a MERV 13 efficiency rating (according to ASHRAE 52.2-2012 standard), and more preferably at least a MERV 14 rating.

With the media and structural arrangement illustrated in the figures and the examples of FIGS. 6 and 7, a much higher dust holding capacity than heretofore can be obtained in a MERV 13 or better filter. Specifically, unlike the typical prior art, a volumetric dust holding capacity of greater than 0.040 grams/cubic-inch can be achieved for a standard 2 foot×2 foot filter, the volumetric dust holding capacity measured according to ASHRAE 52.2, and in fact the volumetric dust holding capacity can be achieved that is greater than 0.050 grams/cubic-inch, or even greater than 0.060 grams/cubic-inch.

In alternative embodiments and to achieve additional dust holding capacity, the polymeric fibers may contain fluorine or other agent to provide an electrostatic charge to provide the filter media. For example, the filter media may be charged to an electret with surface fluorination, which may be according to U.S. Pat. No. 6,419,871, assigned to Transweb, LLC. Other fluorination methods may include the addition of fluorochemicals according to U.S. Pat. Nos. 5,411,576 and 5,472,481 to Jones et al and/or U.S. Pat. No. 5,908,598 to Rousseau et al. Each of the patents is hereby incorporated by reference.

Manufacturing Methodology and Formation

Surprisingly, it has been found that dimpled media can be processed with embossing type pleater machines without destroying the dimples during the embossing process if process conditions are controlled.

Further, surprisingly it has also been found that arranging the dimples (compressed regions) along the downstream or outlet face of the media while leaving the upstream or inlet face flat (but for the embossments), also generates substantial additional dust holding capacity.

A method of processing according to certain embodiments can be done on commercially available pleating and embossing machines as commercially available from TAG, GMBH of Teltow, Germany, and as modified by Filtration Advice, LLC of Miami, Fla. (formerly known as LPD Technologies, Inc.), with the pleater assembly 110 shown in FIG. 9.

The pleater assembly 110 has a tensioning assembly (not shown) to control sheet tension not shown that receives a continuous filter media sheet 50 from a dimpled media roll 112. The sheet on the roll 112 already has formed therein the dimples of the compressed filtration region 58 and the remainder region 60 that may take a dimpled like pattern 62 with "dimples" as previously noted.

After coming off of the roll 112, the dimpled media sheet 50 passes through an oven to soften the media for embossing operations. Pre-heat settings play a role in process efficiency and filter performance and depends upon run line speed, so the oven temperature may not be as important as the media temperature. The heat softens the media, making it more malleable so that embosses can be imparted into the media such that the shape is retained. The heat and malleability of the media are set so that the media stretches rather than ruptures during the score/embossing process.

Once passing through the oven 114, the filter media is pulled through pleating and embossing rolls including top roll 116 and bottom roll 118 that are spaced apart relative to the thickness of the media. These rolls 116, 118 form the embossments for the adhesive spacer attachments and the scores for forming the pleat tips and pleats.

The adjustable parameters associated with the set-up of the pleater rollers 116, 118 can greatly effect process efficiency and filter performance. As shown the pleater tooling is a set of driven precision steel rollers 116, 118 that are mounted perpendicular to web of filter media sheet 50. The rollers have embossment features incorporated into the rollers. Lengthwise slots are also machined into the rollers at prescribed arc lengths apart where score bars are mounted. The rollers also contain female mating surface that allow the meshing of the male embosses and score bars.

While conventional running of the pleating assembly 110 may be employed, the rollers 116, 118 can be adjusted in the following manner by adjusting the roller gap and adjusting the pleat score bars as necessary to generate deeper scoring independent of embossments and/or making shallower embossments in some circumstances. Other than these adjustments, conventional running of the pleater assembly 110 may be employed in terms of line speed and tensioning.

As to the roll gap, the distance between the two rollers 116, 118 can be adjusted. This adjustment determines the emboss and score depth imparted on the media. Varying the roller gap and emboss depth can reduce the emboss height imparted on the media. As the embosses become shallower: the required filter pleat count increases, the embosses become less defined and weaker (collapse under pressure easier) and embosses become less likely to be damaged by ruptured media. As embosses are adjusted to penetrate deeper: the embosses become taller which reduces the finished pleat count, the embosses become stronger as the shape is well formed into the media and the risk of media damage is increased. Contrary to other media types, in an embodiment, the media introduces an additional variable into the process development as the filter performance can be reduced if the "dimples" are crushed and do not rebound during the embossing process.

The score depth is increased or decreased as the roller gap is adjusted. The score depth must be sufficient enough to initiate a fold during the pleat gathering process. The score depth can be adjusted independently of the roller gap settings. As to the efforts of preserving the "dimples" associated with the filter media sheet 50, the pleater roller gap between rolls 116, 118 may be adjusted.

Once passing through the rolls 116, 118, the media sheet 50 now scored and embossed passes through an adhesive applicator 120, 122 (top and bottom applicators) that applies suitable adhesive beads 36 (see also FIG. 2) typically at least over the score pleat tips on both upstream and downstream sides of the filter media sheet, in a continuous or discontinuous manner in rows that run transverse and preferably perpendicular to the pleat tips.

Figure 9:
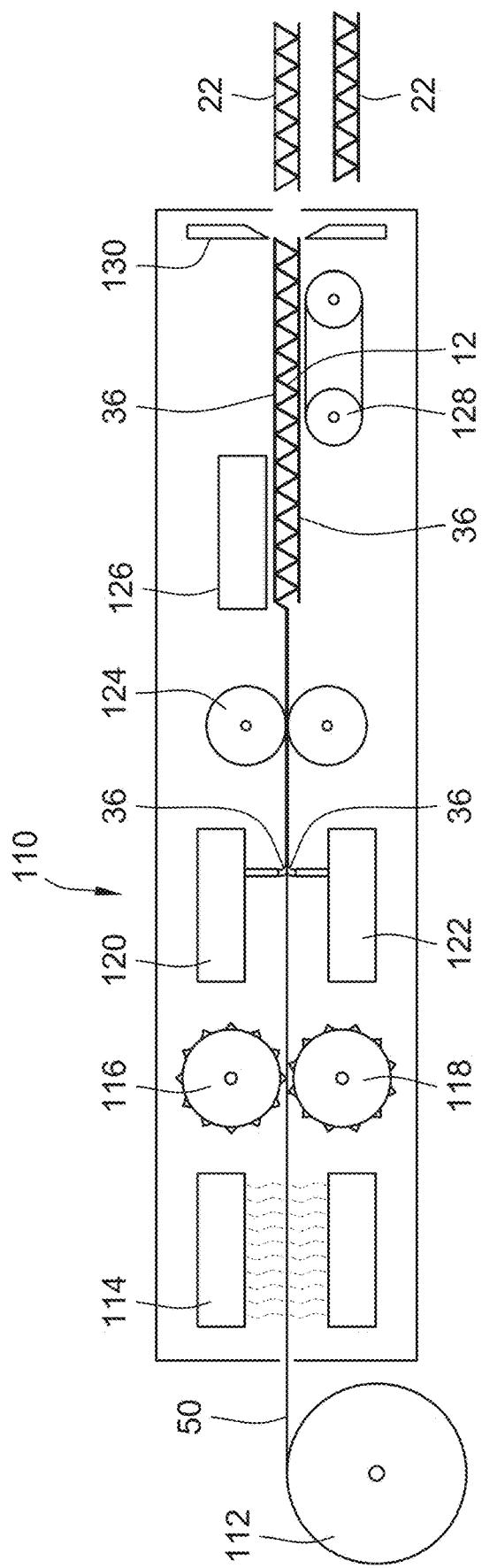
FIG. 9 is a schematic side elevation view of a pleater and method for forming the filter media according to the embodiments above.
Figure 10:
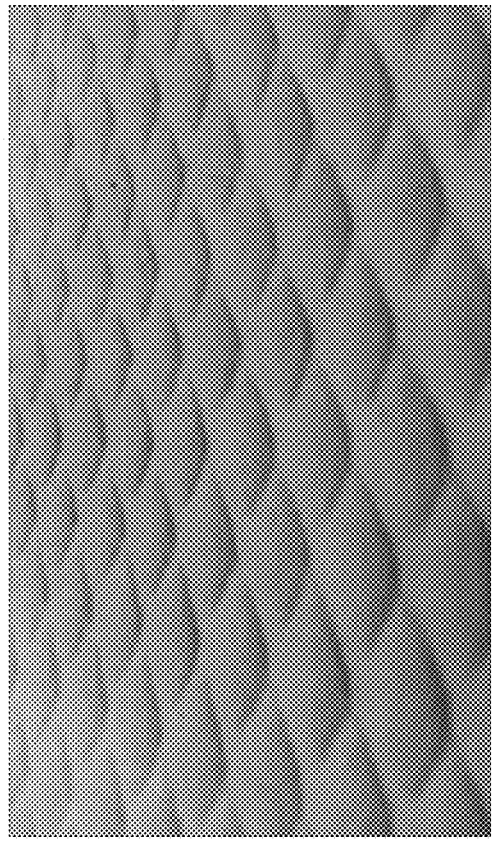
FIG. 10 is a photograph of the downstream or outlet face of a dimpled sheet that has not yet been scored or pleated that is useable in an embodiment of the present invention.

Pull rolls 124 eventually feed the sheet 50 to a folding section 126 that collects the pleats and forms the pleated filter media 12 with the adhesive beads shown schematically over the pleat tips in FIG. 9 (see other FIGS. 1-8 for actual configuration). The pleated filter media 12 is then conveyed on a belt conveyor and transported to a cutting station 130, where the continuous sheet is cut into the correct size and rectangular shape to become the rectangular filter media packs 22.

With embodiments of the present invention, dust holding capacity can be increased. For example, the existing Legacy Filter sold by the present assignee that uses the embossments and adhesive spacers and run on the LPD modified pleater noted above has the following performance for two popular sizes:

24"×24"×4"—No header
Initial Resistance to Air Flow at 1968 CFM=0.46" WC

MERV 14 Efficiency
Dust Holding Capacity=74 grams
49.1 sq. ft. of media.
Actual filter volume 2049 in$^3$
Dust/in$^3$=0.03611
24"×24"×12"—No header
Initial Resistance to Air Flow at 1968 CFM=0.38" WC
MERV 15 Efficiency
Dust Holding Capacity=234 grams
97.3 sq. ft. of media.
Actual filter volume 6487 in$^3$
Dust/in$^3$=0.03607

When the Irema grade TFN83G dimpled media was processed through the pleater with the dimples or compressed regions on the downstream/outlet face of the media sheet, the following results were obtained:
24"×24"×4"—No header
Initial Resistance to Air Flow at 1968 CFM=0.44" WC
MERV 14 Efficiency
Dust Holding Capacity=134 grams
53.1875 sq. ft. of media.
Actual filter volume 2049 in$^3$
Dust/in$^3$=0.06539
24"×24"×12"—No header
Initial Resistance to Air Flow at 1968 CFM=0.27" WC
MERV 15 Efficiency
Dust Holding Capacity=517.5 grams
123.78 sq. ft. of media.
Actual filter volume 6487 in$^3$
Dust/in$^3$=0.07977

As can be seen from test results, nearly double the filter's dirt holding capacity can be achieved which adds value to the product by either extending the change interval or providing a lower air flow restriction over the same range as the current product thereby lowering the energy consumption of the filtration system.

It will also be appreciated that certain applications may not require as much improvement and therefore less efficient or less dust holding capacity can be achieved. However, improvements in dust holding capacity were observed by the provisions of (a) placing the dimpled pattern (compressed region) on the downstream side and outlet face of the media, (b) using the dimpled media in combination with adhesive spacers and embossments, (c) selection of a media that is depth loading rather than surface loading, and (d) operating the pleater/embossing assembly in a manner so as to maintain integrity of the dimples. Any of these are useful by themselves in embodiments, but in combination in other embodiments are advantageous.

Testing Standards

For the tests and standards discussed herein, ANSI/ASHRAE Standard 52.2-2012 applies. As such, the following can be used: ASHRAE #1 test dust obtained from Powder Technology Inc. This test dust consists of 72% ISO 12103-1 A2 Fine, 5.0% milled cotton linters and 23% powdered carbon. This dust is specified for use in ANSI/ASHRAE Standard 52.2-2012. Test conditions include air temperatures between 10° C. and 38° C. (50° F. and 100° F.), relative humidity between 20% and 65%. Test Aerosol shall be polydisperse solid-phase dry potassium chloride (KCl) particles generated from an aqueous solution. Particles shall be counted with an optical particle counter with wide angle as described in ANSI/ASHRAE Standard 52.2-2012 test standard. Face velocity for testing is 492 ft/min with a cumulative dust holding capacity measured at 1.50 WG filter restriction.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of using a panel filter in an air filtration system, the method comprising flowing air through the air filtration system, the air filtration system comprising a housing having a flow path conveying air to at least one of an HVAC system, air inlet for gas Turbine engine, and an industrial process application, and the panel filter being installed in the housing with an inlet face disposed upstream along the flow path relative an outlet face;
   wherein the panel filter includes a filter media element and a boarder frame;
   wherein the filter media element includes:
      a filter media sheet having an inlet face and an outlet face, the filter media sheet being pleated to include a plurality of pleat tips including a first set of pleat tips along an upstream extent and a second set of pleat tips along a downstream extent with pleat flanks extending between the first set of pleat tips and the second set of pleat tips; and
      different filtration regions including a compressed filtration region and a remainder filtration region formed into the filter media sheet providing the filter media with different filtering properties in the different filtration regions;
wherein the border frame surrounds the filter media element;
wherein the filter media element defines an envelope size with a first and second mutually perpendicular spans of between 12 and 36 inches, and a depth of between 1 and 12 inches.

2. The method of claim 1, wherein the compressed filtration region is formed into the outlet face wherein the outlet face comprises elevations and depressions corresponding to the remainder filtration region and the compressed filtration region, respectively.

3. The method of claim 1, wherein the air filtration system is free of a back-pulse mechanism.

4. The method of claim 1, wherein a plurality of adhesive elements extend between adjacent members of the pleat flanks and attach adjacent members of the pleat flanks to separate and space the pleat tips in a spaced relation.

5. A filter media element, comprising:
a filter media sheet having an inlet face and an outlet face, the filter media sheet being pleated to include a plurality of pleat tips including a first set of pleat tips along an upstream extent and a second set of pleat tips along a downstream extent with pleat flanks extending between the first set of pleat tips and the second set of pleat tips;
wherein the filter media element has at least a MERV 14 efficiency rating (according to ASHRAE 52.2-2012 standard), and a volumetric dust holding capacity of greater than 0.040 grams/cubic-inch according to ASHRAE 52.2-2012.

6. The filter media element of claim 5, wherein different filtration regions are formed into the filter media including a compressed filtration region and a remainder filtration region formed into the filter media sheet providing the filter media with different filtering properties in the different filtration regions.

7. The filter media element of claim 6, wherein the compressed filtration region covers between 5 and 50% of the filter media sheet, with the remainder filtration region comprising the remainder and, wherein the compressed filtration region defines a compressed thickness, and the remainder filtration region comprises a regular thickness, the compressed thickness being between 20 and 70% thinner than the regular thickness.

8. The filter media element of claim 6, wherein the compressed filtration region covers between 8 and 20% of the filter media sheet, and the compressed thickness is between 30 and 50% thinner than the regular thickness.

9. The filter media element of claim 8, wherein the compressed thickness is between 0.5 and 1.3 millimeter and wherein the regular thickness is between 1.5 and 3 millimeter.

10. The filter media element of claim 6, wherein adhesive elements are laid upon the filter media sheet along a continuous or discontinuous bead that extends transverse relative to the pleat tips, and further comprising a plurality of embossments formed into the filter media sheet and intersecting the compressed filtration regions and the remainder filtration regions, the embossments being formed in rows that run transverse to the pleat tips, wherein the embossments are proximate pleat tips, and wherein the embossments are on formed into adjacent members of the pleat flanks and project toward each other to narrow a pleat valley defined between adjacent members of the pleat flanks at a location proximate pleat tips, and wherein the adhesive elements extends over the embossments and extend along the rows.

11. The filter media element of claim 10, wherein the compressed filtration region is formed into the outlet face wherein the outlet face comprises elevations and depressions corresponding to the remainder filtration region and the compressed filtration region, respectively.

12. The filter media element of claim 5, wherein the volumetric dust holding capacity is greater than 0.055 grams/cubic-inch.

13. The filter media element of claim 5, wherein the filter media sheet is a composite of coarser fibers and finer fibers, the coarser fibers having a diameter greater than 2 micron and the finer fibers having a diameter of less than 2 micron, wherein a heavier relative coverage of coarser fibers are arranged proximate the inlet face compared to an outlet face of the filter media sheet, the spaced region being spaced from the inlet face by at least 0.2 millimeter, and wherein a heavier relative coverage of finer fibers are arranged in the spaced region of the filter media sheet as compared to the inlet face.

14. The filter media element of claim 13, wherein the coverage of fine fiber are closer to the outlet face as compared to the inlet face.

15. A method of filtering particulates from an air flow comprising:
advancing the air flow through a filter media element of claim 5 including advancing the air flow through the filter media element in a direction from the upstream extent to the downstream extent to cause particulates to load in a depth of the filter media.

16. A filter media element, comprising:
a filter media sheet having an inlet face and an outlet face, the filter media sheet being pleated to include a plurality of pleat tips including a first set of pleat tips along an upstream extent and a second set of pleat tips along a downstream extent with pleat flanks extending between the first set of pleat tips and the second set of pleat tips;
different filtration regions including a compressed filtration region and a remainder filtration region formed into the filter media sheet providing the filter media with different filtering properties in the different filtration regions; and
wherein the compressed filtration region is formed into the outlet face wherein the outlet face comprises elevations and depressions corresponding to the remainder filtration region and the compressed filtration region, respectively.

17. The filter media element of claim 16, wherein the filter media sheet is a composite of coarser fibers and finer fibers, the coarser fibers having a diameter greater than 2 micron and the finer fibers having a diameter of less than 2 micron, wherein a heavier relative coverage of coarser fibers are arranged proximate the inlet face compared to an outlet face of the filter media sheet, the spaced region being spaced from the inlet face by at least 0.2 millimeter, and wherein a heavier relative coverage of finer fibers are arranged in the spaced region of the filter media sheet as compared to the inlet face.

18. The filter media element of claim 17, wherein the coverage of fine fiber are closer to the outlet face as compared to the inlet face.

19. The filter media element of claim 16, wherein the compressed filtration region covers between 5 and 50% of the filter media sheet, with the remainder filtration region comprising the remainder and, wherein the compressed filtration region defines a compressed thickness, and the remainder filtration region comprises a regular thickness, the compressed thickness being between 20 and 70% thinner than the regular thickness.

20. The filter media element of claim 19, wherein the compressed filtration region covers between 8 and 20% of the filter media sheet, and the compressed thickness is between 30 and 50% thinner than the regular thickness.

21. The filter media element of claim 5, wherein the compressed thickness is between 0.5 and 1.3 millimeter and wherein the regular thickness is between 1.5 and 3 millimeter.

22. A method of filtering particulates from an air flow comprising:
    advancing the air flow through a filter media element of claim 16 including advancing the air flow through the filter media element in a direction from the upstream extent to the downstream extent to cause the particulates to load in a depth of the filter media.

23. A method of making a filter, comprising:
    advancing a filter media sheet having an inlet face and an outlet face and with different filtration regions including a compressed filtration region and a remainder filtration region formed into the filter media sheet providing the filter media with different filtering properties in the different filtration regions through a heater;
    heating the filter media sheet; thereafter
    embossing the filter media sheet with embossments;
    scoring the filter media sheet with scores running transvers to the advancing;
    laying continuous or discontinuous adhesive beads along the filter media sheet and over the embossments; and
    folding the filter media sheet along the scores to provide a plurality of pleat tips including a first set of pleat tips along an upstream extent and a second set of pleat tips along a downstream extent with pleat flanks extending between the first set of pleat tips and the second set of pleat tips; and a plurality of adhesive elements extending between adjacent members of the pleat flanks and attaching adjacent members of the pleat flanks to separate and space the pleat tips in a spaced relation.

24. The method of claim 23, wherein the compressed filtration region covers between 5 and 50% of the filter media sheet, with the remainder filtration region comprising the remainder and, wherein the compressed filtration region defines a compressed thickness, and the remainder filtration region comprises a regular thickness, the compressed thickness being between 20 and 70% thinner than the regular thickness.

25. The method of claim 24, wherein the compressed filtration region covers between 8 and 20% of the filter media sheet, and the compressed thickness is between 30 and 50% thinner than the regular thickness.

26. The method of claim 24, wherein during the embossing, the embossing maintaining a thickness of the filter media sheet to within 15% of an original thickness.

27. The filter media element of claim 16, wherein each of a plurality of the pleat flanks includes different filtration regions including at least one compressed filtration region and a plurality of remainder filtration regions that provide each of the plurality of pleat flanks with different filtering properties in the different filtration regions.

28. The filter media element of claim 27, wherein the compressed filtration region forms at least one groove in each of the plurality of the pleat flanks and the remainder filtration region is on opposed sides of the groove.

29. The filter media element of claim 16, wherein the compressed filtration region has an outer surface that is fully exposed and unblocked.

30. The filter media element of claim 16, where the pleat tips are folds between the adjacent members of the pleat flanks.

* * * * *